W. GUERRERO.
FILTERING FRAME FOR FILTER PRESSES.
APPLICATION FILED MAR. 17, 1915.

1,193,779.

Patented Aug. 8, 1916.

INVENTOR:
Wladimir Guerrero
ATTY.

UNITED STATES PATENT OFFICE.

WLADIMIR GUERRERO, OF MADRID, SPAIN.

FILTERING-FRAME FOR FILTER-PRESSES.

1,193,779. Specification of Letters Patent. Patented Aug. 8, 1916.

Application filed March 17, 1915. Serial No. 14,894.

*To all whom it may concern:*

Be it known that I, WLADIMIR GUERRERO, subject of the King of Spain, residing at Madrid, Spain, have invented new and useful Improvements in Filtering-Frames for Filter-Presses, of which the following is a specification.

This invention has for its object to considerably increase the output of filter presses while reducing the weight of the same, by substituting for the grooved solid plates hitherto used as outlet chambers for the filtered liquids, frames provided with a double grating forming two open work walls between which is provided a free space in which opens the outlet port.

It is well known that the grooved solid plates have the disadvantage that in consequence of the pressure to which the liquids to be filtered are subjected, the filtering cloths being forced against the plates, gradually enter the grooves therein and finally come in such close contact with the walls of said grooves as to cut off the passage of the liquid and stop the action of the filter. The above disadvantage is found not only with plates having parallel grooves but also when the plates are provided with crossed grooves or diamond cut projections. To overcome this disadvantage it has been proposed to insert perforated metal sheets between the cloths and the grooved plates but such sheets restrain the free passage of the liquid through the cloths and interfere with the proper working of the filter.

When using frames constructed according to the present invention, the cloths pressed within the openings of the grates do not meet with any surface with which to come into contact so that the passage of the liquid through the cloths can continue so long as is allowed by the permeability of the cakes formed by the separated solid matter.

The accompanying drawing shows several forms in which the invention can be performed.

Figure 1:
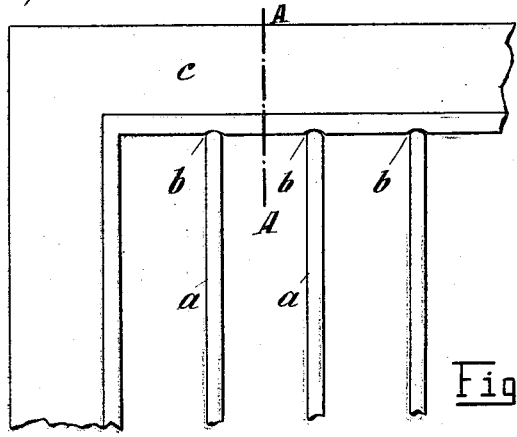
Figure 2:
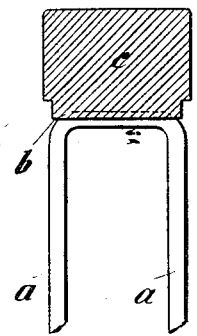
Figure 3:
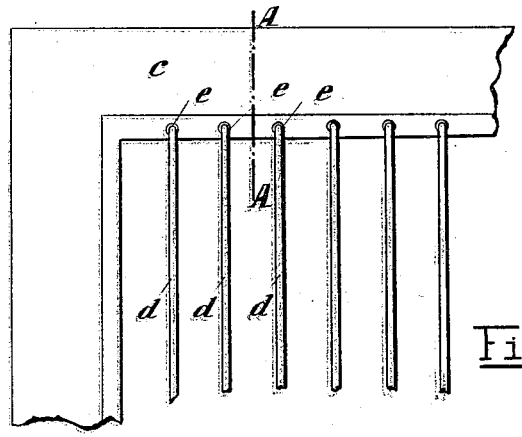
Figure 4:
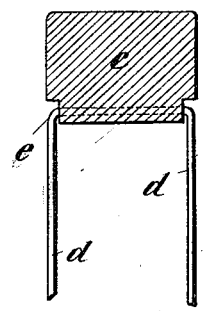
Figure 5:
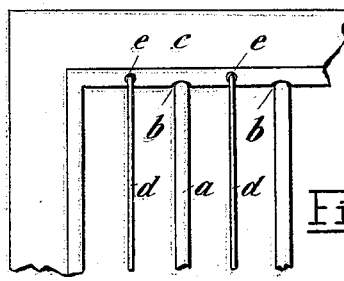
Figure 6:
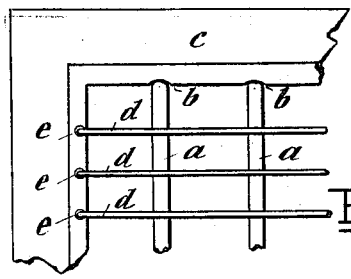
Figure 7:
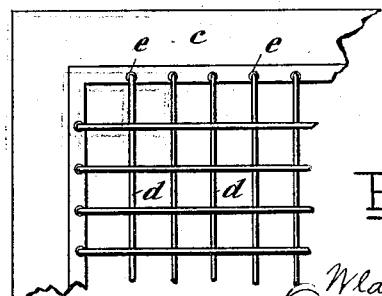

Figure 1 is a front elevation of a portion of a filter frame element constructed in accordance with the invention. Fig. 2 is a cross-sectional view on line A—A of Fig. 1. Fig. 3 is a view similar to Fig. 1 of a modified form of the device. Fig. 4 is a cross-sectional view on line A—A of Fig. 3. Fig. 5 is a front elevation of portion of a further modified form of frame element. Fig. 6 is a similar view of a further modification. Fig. 7 is a similar view of another modification.

Referring to the drawings and in particular to Figs. 1 and 2, *a* designates the double metal bars or rods which constitute the grate members. The side portions of these grate members are substantially parallel and their ends are curved to provide transverse connecting portions which are secured in sockets which are in the form of grooves *b* in the internal face or edge of the frame proper *c*. A double grate is thus formed between the sides of which a space is provided.

In Figs. 3 and 4, the device is shown as being modified by constructing the grate members of wires *d* instead of large bars or rods. In this instance the cross portions of the grate members are secured to the frame *c* by being passed through sockets in the form of holes *e* provided in the inner edge portion of the same.

In Fig. 5 both wire grate members and rod grate members are employed in the frame, the wires *d* being arranged alternately between rods *a* and parallel thereto.

In Fig. 6 both wires and rods are used in the construction of the grate members, but the wires are arranged transversely of the rods.

In Fig. 7 the grate members are composed entirely of wires and the side portions thereof cross each other.

The bars or rods and the wires can be secured to the frames in any suitable manner other than those represented.

What I claim as my invention and desire to secure by Letters Patent is:

1. A filter element for filter-presses comprising a border frame having sockets in its inner edge, and a double grate provided within the frame and affording a free space between its side portions, said grate consisting of elongated members including parallel side portions and transverse connecting portions, the latter portions alone being engaged in the frame sockets and the side portions being substantially flush with the opposite faces of the frame.

2. A filter element for filter-presses comprising a border frame having sockets in its inner edge in the form of transverse grooves, and a double grate provided within the frame and affording a free space between its side portions, said grate consisting of elongated members including parallel side portions and transverse connecting portions, the latter portions alone being engaged in the socket-forming grooves of the frame.

In testimony whereof I have signed my name to this specification in the presence of two witnesses.

WLADIMIR GUERRERO.

Witnesses:
LÉON PIÉRARD,
H. T. E. KIRKPATRICK.

Copies of this patent may be obtained for five cents each, by addressing the "Commissioner of Patents, Washington, D. C."